United States Patent
Luan et al.

(10) Patent No.: US 11,711,243 B2
(45) Date of Patent: Jul. 25, 2023

(54) PACKET PROCESSING METHOD AND GATEWAY DEVICE

(71) Applicant: Huawei Technologies Co., Ltd., Shenzhen (CN)

(72) Inventors: Xiaolei Luan, Beijing (CN); Dacheng Li, Nanjing (CN); Jiuyong Li, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 93 days.

(21) Appl. No.: 17/162,757

(22) Filed: Jan. 29, 2021

(65) Prior Publication Data

US 2021/0184897 A1 Jun. 17, 2021

Related U.S. Application Data

(63) Continuation of application No. PCT/CN2020/076563, filed on Feb. 25, 2020.

(30) Foreign Application Priority Data

Feb. 25, 2019 (CN) .......................... 201910138771.X

(51) Int. Cl.
*H04L 45/00* (2022.01)
*H04L 12/66* (2006.01)
*H04L 45/74* (2022.01)

(52) U.S. Cl.
CPC .............. *H04L 12/66* (2013.01); *H04L 45/22* (2013.01); *H04L 45/26* (2013.01); *H04L 45/74* (2013.01)

(58) Field of Classification Search
None
See application file for complete search history.

(56) References Cited

U.S. PATENT DOCUMENTS

| 11,076,026 B1* | 7/2021 | Licking | H04L 43/0811 |
| 2007/0180104 A1* | 8/2007 | Filsfils | H04L 45/28 |
| | | | 709/227 |

(Continued)

FOREIGN PATENT DOCUMENTS

| CN | 101459594 B | 4/2011 |
| CN | 105847460 A | 8/2016 |

(Continued)

OTHER PUBLICATIONS

Pignataro et al., "Seamless Bidirectional Forwarding Detection (S-BFD)," Internet Engineering Task Force (IETF), Request for Comments: 7880, Total 24 pages, Standards Track (Jul. 2016).

*Primary Examiner* — Abdelillah Elmejjarmi
(74) *Attorney, Agent, or Firm* — Leydig, Voit & Mayer, Ltd.

(57) ABSTRACT

A packet processing method and a gateway device are provided. The method includes: A first gateway device receives, by using a first link, a first one-arm BFD echo packet returned by a network device, where the first one-arm BFD echo packet includes identification information, and the identification information is used to uniquely identify a second gateway device. The first gateway device determines, based on the identification information, to forward the first one-arm BFD echo packet to the second gateway device. The first gateway device sends the first one-arm BFD echo packet to the second gateway device. The network device is multi-homed connected to the first gateway device and the second gateway device. The first gateway device and the second gateway device form a multi-active gateway. According to the method, efficiency of detecting, by using a one-arm BFD echo session in a VXLAN multi-active gateway scenario is improved.

20 Claims, 9 Drawing Sheets

(56) References Cited

U.S. PATENT DOCUMENTS

| | | | |
|---|---|---|---|
| 2007/0207591 A1* | 9/2007 | Rahman | H04L 45/28 438/439 |
| 2012/0036279 A1* | 2/2012 | Boutros | H04L 69/16 709/238 |
| 2016/0191327 A1* | 6/2016 | Bi | H04L 41/12 370/352 |
| 2017/0257260 A1 | 9/2017 | Govindan et al. | |
| 2018/0183654 A1 | 6/2018 | Patel et al. | |

FOREIGN PATENT DOCUMENTS

| | | | |
|---|---|---|---|
| CN | 106209517 | A | 12/2016 |
| CN | 107078924 | A | 8/2017 |
| CN | 107210947 | A | 9/2017 |
| CN | 107547383 | A | 1/2018 |
| CN | 107809364 | A | 3/2018 |
| CN | 107948041 | A | 4/2018 |
| CN | 108574614 | A | 9/2018 |
| CN | 108574630 | A | 9/2018 |
| EP | 2383934 | B1 | 5/2012 |
| EP | 3171555 | A1 | 5/2017 |
| WO | 2017158401 | A1 | 9/2017 |

\* cited by examiner

PACKET PROCESSING METHOD AND GATEWAY DEVICE

CROSS-REFERENCE TO RELATED APPLICATIONS

This application is a continuation of International Application No. PCT/CN2020/076563, filed on Feb. 25, 2020, which claims priority to Chinese Patent Application No. 201910138771.X, filed on Feb. 25, 2019. The disclosures of the aforementioned applications are hereby incorporated by reference in their entireties.

TECHNICAL FIELD

This application relates to the communications field, and more specifically, to a packet processing method and a gateway device.

BACKGROUND

In a virtual extensible local area network (VXLAN) multi-active gateway scenario, a plurality of gateway devices are simulated as one VXLAN tunnel end point by configuring a same virtual tunnel end point (VTEP) address for the plurality of gateway devices. In this way, no matter to which gateway device traffic is sent, the gateway device can provide a gateway service and correctly forward a packet to a next-hop device. A one-arm bidirectional forwarding detection (BFD) packet detection mechanism is a detection mechanism in which a local device sends a one-arm BFD echo (echo) packet to a remote device and the remote device loops back the one-arm BFD echo packet to the local device. The local device may determine, through detection and based on the one-arm BFD echo packet looped back by the remote device, whether the remote device is faulty. In the VXLAN multi-active gateway scenario, a virtual bridge domain interface (VBDIF) of each gateway device is configured with a same internet protocol (IP) address. A source address and a destination address in a one-arm BFD packet sent by each gateway device are set to the IP address of the VBDIF of the gateway device. In the prior art, after receiving a one-arm BFD echo packet sent by a gateway device, a peer device returns the one-arm BFD echo packet based on a destination address of the one-arm BFD echo packet. Based on a hash algorithm-based path selection, the one-arm BFD echo packet may be returned to another gateway device and be discarded. In this case, the gateway device that sends the one-arm BFD echo packet cannot receive the packet looped back. As a result, the gateway device fails to establish a BFD echo session with the peer device, and the BFD echo packet detection mechanism becomes invalid. The gateway device may incorrectly determine that a remote device is faulty, and a service of the remote device is affected.

SUMMARY

This application provides a packet processing method and a gateway device, to improve accuracy of detecting, by using a one-arm BFD echo session, a network device fault in a VXLAN multi-active gateway scenario, and improve system working efficiency.

According to a first aspect, a packet processing method is provided, where the method includes:

A first gateway device receives, by using a first link, a first one-arm bidirectional forwarding detection BFD echo packet returned by a network device, where the first one-arm BFD echo packet includes identification information, and the identification information is used to uniquely identify a second gateway device. The first gateway device determines, based on the identification information, to forward the first one-arm BFD echo packet to the second gateway device. The first gateway device sends the first one-arm BFD echo packet to the second gateway device. The network device is multi-homed connected to the first gateway device and the second gateway device, the network device is connected to the first gateway device by using the first link, the network device is connected to the second gateway device by using a second link, and the first gateway device and the second gateway device form a multi-active gateway.

According to the packet processing method provided in the first aspect, after the second gateway device sends the first one-arm BFD echo packet, if the network device hashes the returned packet to the first gateway device, the first gateway device sends, based on identification information carried in the received first one-arm BFD echo packet, the first one-arm BFD echo packet to the second gateway device uniquely identified by the identification information. Therefore, regardless of whether the network device returns, by using the second link, the first one-arm BFD echo packet, if the network device is not faulty, the second gateway device may normally receive the first one-arm BFD echo packet returned by the network device, to implement a one-arm BFD echo session function of the second gateway device. When the network device is not faulty, it may be effectively ensured that a one-arm BFD echo session of the second gateway device always takes effect, to improve efficiency of detecting, by using the one-arm BFD echo session, whether the network device is normal in a VXLAN multi-active gateway scenario, improve service fast detection and switchover capabilities of the first gateway device and the second gateway device, and improve system working efficiency.

In a possible design of the first aspect, the identification information is a destination address of the first one-arm BFD echo packet, and the destination address of the first one-arm BFD echo packet is different from a source address of the first one-arm BFD echo packet. In this implementation, the destination address of the first one-arm BFD echo packet is used as the identification information, to improve accuracy of the identification information, help the first gateway device determine the second gateway device based on the identification information, improve efficiency of determining the second gateway device by the first gateway device, and improve system working efficiency.

In a possible design of the first aspect, the method further includes: The first gateway device generates a second one-arm BFD echo packet, where a destination address of the second one-arm BFD echo packet is used to uniquely identify the first gateway device, and the destination address of the second one-arm BFD echo packet is different from the destination address of the first one-arm BFD echo packet. The first gateway device sends, by using the first link, the second one-arm BFD echo packet to the network device.

In a possible design of the first aspect, that the first gateway device determines, based on the identification information, to forward the first one-arm BFD echo packet to the second gateway device includes: The first gateway device determines routing information based on the destination address of the first one-arm BFD echo packet. The first gateway device determines, based on the routing information, to forward the first one-arm BFD echo packet to the second gateway device.

In a possible design of the first aspect, the destination address of the first one-arm BFD echo packet is a loopback interface address of the second gateway device, the destination address of the second one-arm BFD echo packet is a loopback interface address of the first gateway device. The loopback interface address of the first gateway device is different from the loopback interface address of the second gateway device.

In a possible design of the first aspect, the identification information is a first my discriminator MD and/or a first your discriminator YD carried in the first one-arm BFD echo packet. In this implementation, the MD and/or the YD carried in the first one-arm BFD echo packet are/is used as the identification information to determine a device that generates the one-arm BFD echo packet, to improve accuracy of the identification information and facilitate implementation.

In a possible design of the first aspect, the method further includes: The first gateway device generates a third one-arm BFD echo packet, where a second YD carried in the third one-arm BFD echo packet is used to uniquely identify the first gateway device, and the second YD is different from the first YD. The first gateway device sends, by using the first link, the third BFD echo packet to the network device.

According to a second aspect, a first gateway device is provided, including: a receiving module, configured to receive, by using a first link, a first one-arm bidirectional forwarding detection BFD echo packet returned by a network device, where the first one-arm BFD echo packet includes identification information, and the identification information is used to uniquely identify a second gateway device; a processing module, configured to determine, based on the identification information, to forward the first one-arm BFD echo packet to the second gateway device; and a sending module, configured to send the first one-arm BFD echo packet to the second gateway device. The network device is multi-homed connected to the first gateway device and the second gateway device, the network device is connected to the first gateway device by using the first link, the network device is connected to the second gateway device by using a second link, and the first gateway device and the second gateway device form a multi-active gateway.

In a possible design of the second aspect, the identification information is a destination address of the first one-arm BFD echo packet, and the destination address of the first one-arm BFD echo packet is different from a source address of the first one-arm BFD echo packet.

In a possible design of the second aspect, the processing module is further configured to generate a second one-arm BFD echo packet. A destination address of the second one-arm BFD echo packet is used to uniquely identify the first gateway device, and the destination address of the second one-arm BFD echo packet is different from the destination address of the first one-arm BFD echo packet. The sending module is further configured to send, by using the first link, the second one-arm BFD echo packet to the network device.

In a possible design of the second aspect, the processing module is further configured to: determine routing information based on the destination address of the first one-arm BFD echo packet, and determine, based on the routing information, to forward the first one-arm BFD echo packet to the second gateway device.

In a possible design of the second aspect, the destination address of the first one-arm BFD echo packet is a loopback interface address of the second gateway device, and the destination address of the second one-arm BFD echo packet is a loopback interface address of the first gateway device. The loopback interface address of the first gateway device is different from the loopback interface address of the second gateway device.

In a possible design of the second aspect, the identification information is a first your discriminator YD carried in the first one-arm BFD echo packet.

In a possible design of the second aspect, the processing module is further configured to generate a third one-arm BFD echo packet, where a second YD carried in the third one-arm BFD echo packet is used to uniquely identify the first gateway device, and the second YD is different from the first YD. The sending module is further configured to send, by using the first link, the third BFD echo packet to the network device.

According to a third aspect, a first gateway device is provided, including a processor and a memory connected to the processor. The memory is configured to store a computer program, and the processor is configured to invoke the computer program from the memory and run the computer program, to enable the first gateway device to perform the method in any one of the first aspect or the possible designs of the first aspect.

According to a fourth aspect, a computer program product is provided. The computer program product includes computer program code. When the computer program code is run on a computer, the computer is enabled to perform the method in any one of the first aspect or the possible designs of the first aspect.

It should be noted that some or all of the computer program code may be stored in a first storage medium. The first storage medium may be encapsulated with a processor, or may be encapsulated separately from a processor. This is not specifically limited in embodiments of this application.

According to a fifth aspect, a computer-readable medium is provided. The computer-readable medium stores program code, and when the computer program code is run on a computer, the computer is enabled to perform the method in any one of the first aspect or the possible designs of the first aspect.

According to a sixth aspect, a chip system is provided. The chip system is configured to implement a function in the method in any one of the first aspect or the possible designs of the first aspect, for example, generating, receiving, sending, or processing data and/or information in the method. In a possible design, the chip system further includes a memory. The memory is configured to store a program instruction and data that are necessary for a first gateway device. The chip system may include a chip, or may include a chip and another discrete component.

DETAILED DESCRIPTION OF EMBODIMENTS

The following describes technical solutions in embodiments of this application with reference to the accompanying drawings. A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that with evolution of the network architecture and emergence of a new service scenario, the technical solutions provided in the embodiments of this application are also applicable to a similar technical problem.

Ordinal numbers such as "1", "2", "3", "first", "second", and "third" in this application are used to distinguish between a plurality of objects, but are not used to limit a sequence of the plurality of objects.

For ease of understanding, technical terms used in the embodiments of this application are first briefly described.

A bridge domain (BD) is a layer 2 broadcast domain in which a data packet is forwarded on a VXLAN network.

A VBDIF is a layer 3 logical interface created based on the BD. A value of an IP is configured for the VBDIF, so that communication between VXLANs on different network segments and communication between a VXLAN and a non-VXLAN may be implemented, and a layer 2 network may access a layer 3 network.

Figure 1:
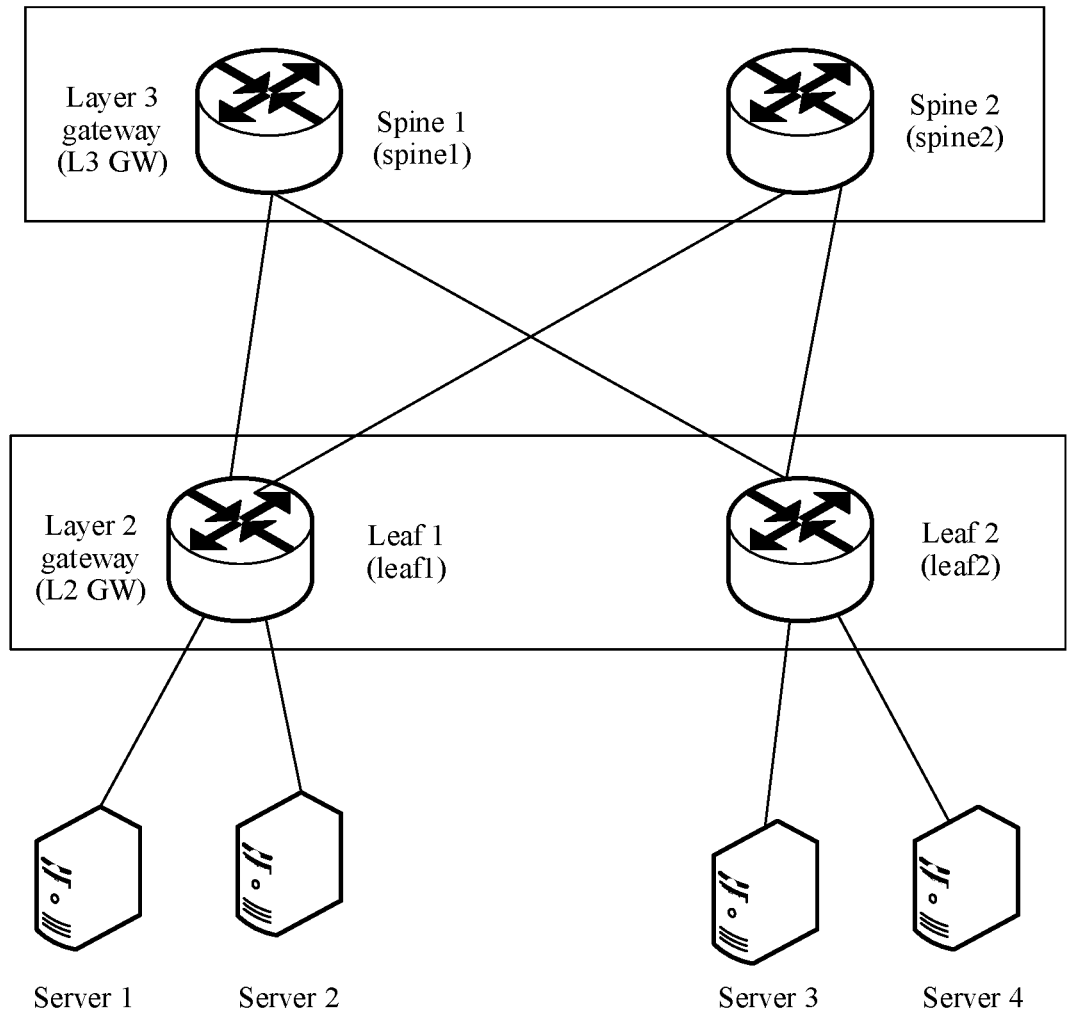
FIG. 1 is a schematic diagram of a deployment manner of a centralized gateway.
Figure 2:
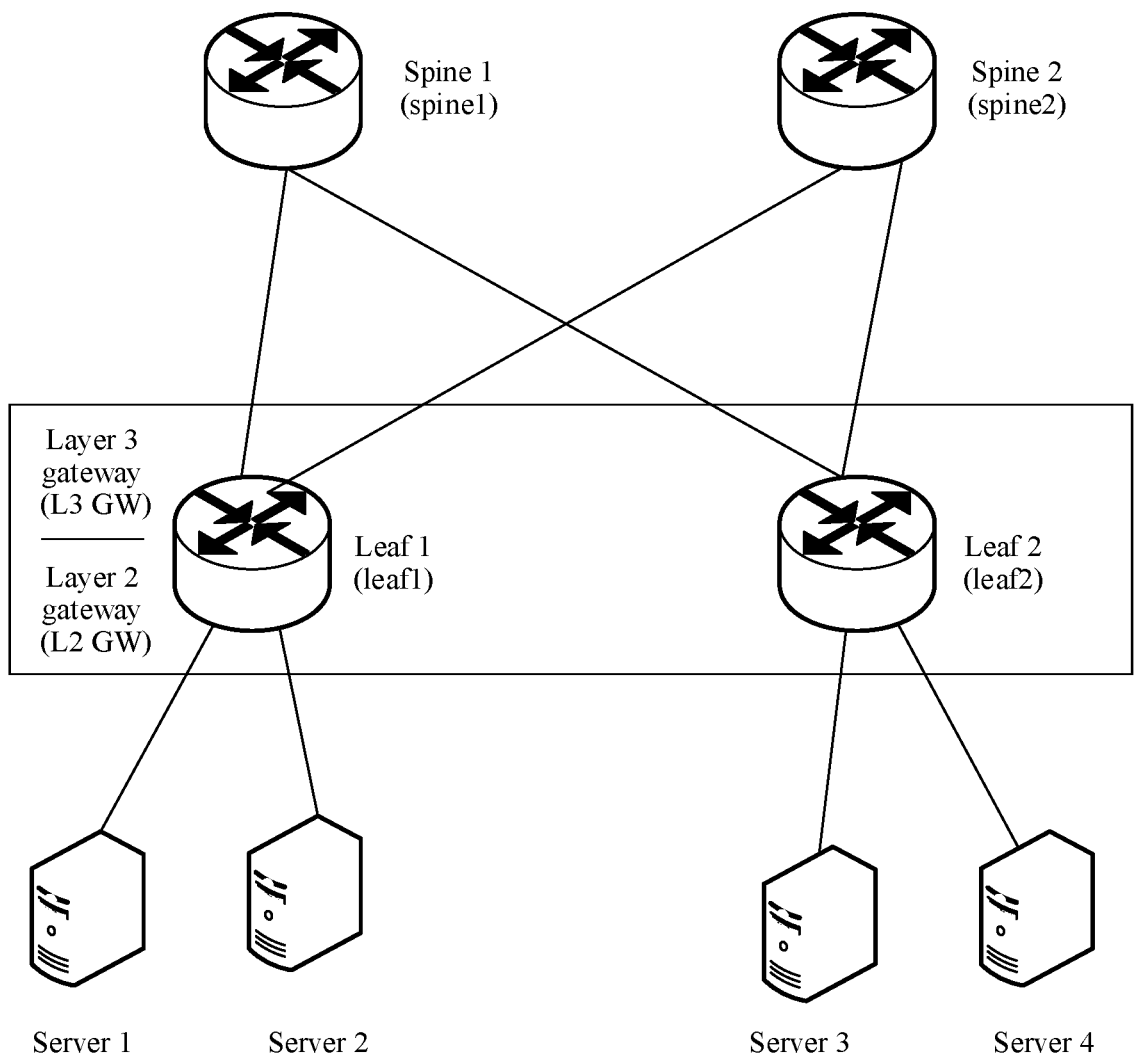
FIG. 2 is a schematic diagram of a deployment manner of a distributed gateway.

A layer 3 gateway (L3 GW) may be deployed on the VXLAN network. Based on a deployment mode, gateways on the VXLAN are classified into a centralized gateway (GW) and a distributed gateway. The centralized gateway means that the layer 3 gateway is deployed on one device. For example, in a typical "spine-leaf" networking structure, the centralized gateway means that the layer 3 gateway is deployed on a spine node. The distributed gateway means that both a layer 2 gateway L2 GW and the layer 3 gateway are deployed on a leaf node. The leaf node is used as a VTEP of a VXLAN tunnel, and each leaf node may be used as the layer 3 gateway on the VXLAN. The spine node does not detect the VXLAN tunnel and is only used as a forwarding node of a VXLAN packet. FIG. 1 is a schematic diagram of a deployment manner of a typical centralized gateway. In a centralized deployment manner, an L3 GW is located on a spine device. FIG. 2 is a schematic diagram of a deployment manner of a distributed gateway. In a distributed deployment manner, both an L2 GW and an L3 GW are located on a leaf device.

A one-arm bidirectional forwarding detection (BFD) function, namely a BFD one-arm echo function, is a detection mechanism in which a local device sends a one-arm BFD echo packet to a remote device and the remote device loops back the BFD echo packet to the local device. The detection mechanism is usually used in two directly connected devices. If one device supports the BFD function, and the other device does not support (or supports) the BFD function, a BFD echo session of the BFD one-arm echo function is created on the device that supports the BFD function, and after receiving the BFD echo packet, the device that does not support the BFD function directly loops back the BFD echo packet, to quickly detect whether the remote device is faulty. The one-arm echo session does not require echo capability negotiation between the two devices. One device is configured with the BFD detection mechanism, and the other device does not need to have the BFD capability. The device with the one-arm echo function sends a one-arm BFD packet. In an internet protocol (internet protocol, IP) in the one-arm BFD packet, both a source IP address (source IP, SIP) and a destination IP address (destination IP, DIP) are an IP address of the local device (the device that creates the one-arm BFD echo session). A my discriminator (MD) and a your discriminator (YD) in the one-arm BFD echo packet are the same. After receiving the one-arm BFD packet, a peer device directly loops back the one-arm BFD packet to the local device.

Figure 3:
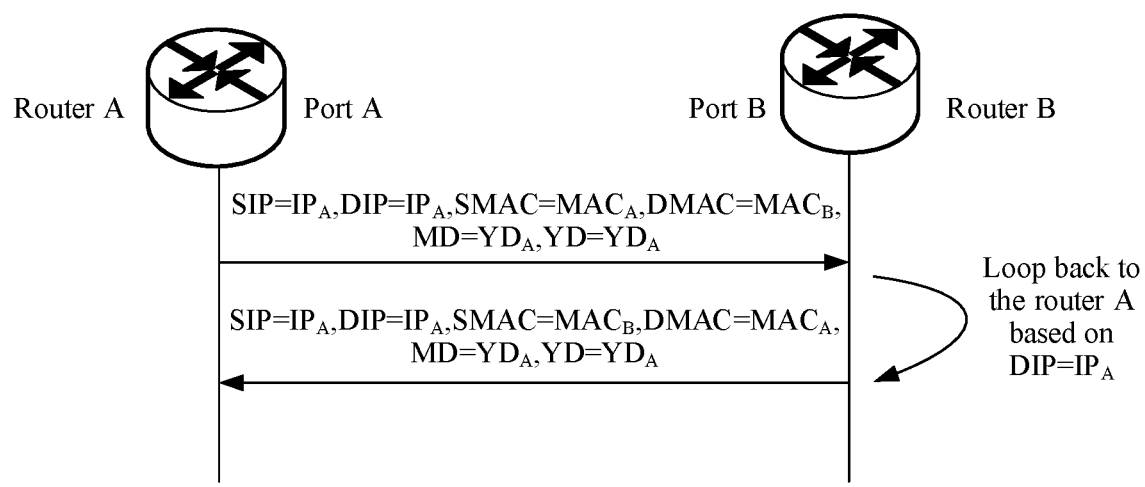
FIG. 3 is a schematic diagram of loopback of a one-arm BFD echo packet between two devices.

FIG. 3 is a schematic diagram of loopback of a one-arm BFD echo packet between two devices.

As shown in FIG. 3, a router A supports a BFD protocol. The router A may generate a one-arm BFD echo packet, and send the one-arm BFD echo packet to a router B. The router A may establish a one-arm BFD echo session with the one-arm BFD echo packet based on the one-arm BFD echo packet returned (looped back) by the router B. The router B does not support the one-arm BFD protocol. In this case, the one-arm BFD protocol may be deployed to establish the one-arm BFD echo session on the router A. The router A generates the one-arm BFD echo packet and sends the one-arm BFD echo packet to the router B. A source IP address (SIP) in the one-arm BFD echo packet is an IP address IPA of a port A (Port A) on the router A, and a destination IP address (DIP) in the one-arm BFD echo packet is also the IP address IPA of the port A on the router A. Values of a YD and an MD in the one-arm BFD packet are the same, which are represented by YDA. A source media access control (SMAC) address in the one-arm BFD echo packet sent by the router A to the router B is a MAC address of the port A on the router A, and is represented by MACA. A destination media access control (DMAC) address in the one-arm BFD echo packet is a MAC address of a port B on the router B, and is represented by MACB. After receiving the one-arm BFD packet, the router B directly loops back, based on the destination IP address in the packet, the packet to the router A. In the one-arm BFD packet looped back from the router B to the router A, the SMAC address is MACB and the DMAC address is MACA. The port A shown in FIG. 3 is, for example, a VBDIF interface.

A VXLAN multi-active gateway is that in a typical "spine-leaf" networking structure, a plurality of gateway devices are simulated as one VXLAN tunnel end point by configuring a same VTEP address for the plurality of gateway devices. The VXLAN multi-active gateway is classified into a centralized VXLAN multi-active gateway and a distributed VXLAN multi-active gateway. For example, for the centralized VXLAN multi-active gateway, a plurality of spine devices are simulated as one VXLAN tunnel end point by configuring a same VTEP address for the plurality of spine devices. All spine devices each are configured with a layer 3 gateway, so that no matter to which spine device traffic is sent, the spine device can provide a gateway service and correctly forward the packet to a next-hop device. Similarly, traffic from another network to a local network can be correctly forwarded to a host within the network, no matter to which spine device the traffic is sent. The centralized VXLAN multi-active gateway improves usage of devices and network convergence performance in case of a fault.

Figure 4:
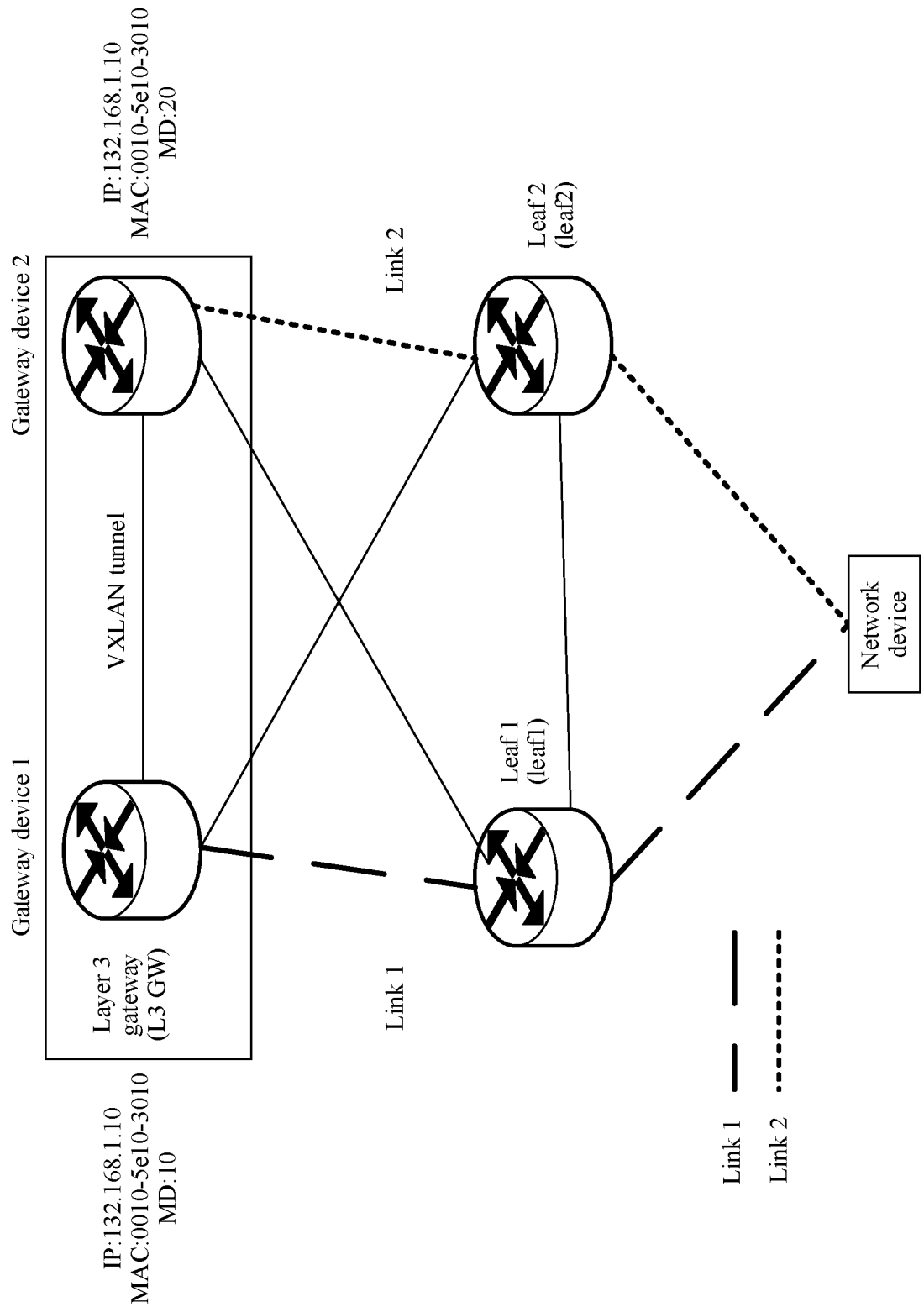
FIG. 4 is a schematic diagram of a centralized VXLAN active-active gateway scenario.

With reference to FIG. 4, the following describes an application scenario of this application by using a centralized VXLAN active-active gateway as an example. A person skilled in the art may understand that a scenario shown in FIG. 4 is merely an example for description, and this embodiment of this application may also be used in a distributed VXLAN multi-active gateway. Details are not described herein again.

As shown in FIG. 4, a network system 100 includes two gateway devices, two leaf nodes, and a network device. The two gateway devices are respectively a gateway device 1 and a gateway device 2. The two leaf nodes are respectively a leaf 1 and a leaf 2. The network device is connected to the gateway device 1 by using a link 1, and the network device is connected to the gateway device 2 by using a link 2. The gateway devices are connected to each other by using a VXLAN tunnel, and the gateway devices are connected to the leaf nodes by using VXLAN tunnels. A VBDIF of the gateway device 1 and a VBDIF of the gateway device 2 are configured with a same IP address and a same MAC address. For example, the IP address is 132.168.1.10 and the MAC address is 0010-5e10-3010. An IP address of the network device is 132.168.1.1. The network system 100 may be, for example, used in a data center. The gateway device may be, for example, a data center gateway (DCGW). The leaf nodes may be, for example, a virtual machine (VM). The network devices may be, for example, switches or routers. The network system may include more gateway devices, network devices, and leaf nodes. This is not specifically limited in this application.

In the prior art, a gateway device 1 sends a one-arm BFD echo packet to a network device. If the network device is faulty, the gateway device 1 cannot receive the one-arm BFD echo packet returned by the network device. In this way, the network device 1 quickly detects a network device fault and quickly switches services.

However, in an actual situation, the gateway device 1 and the gateway device 2 are configured with a same VBDIF address. Therefore, after receiving the one-arm BFD echo packet, the network device selects a path based a hash algorithm, and may return the received one-arm BFD echo packet to the gateway device 2 by using the link 2. After receiving the one-arm BFD echo packet, the gateway device 2 identifies that a destination address of the one-arm BFD echo packet is an IP address of a local VBDIF. However, an MD of the one-arm BFD echo packet does not match an MD stored in the gateway device 2. Therefore, the gateway device 2 discards the received packet. In this case, the gateway device 1 cannot receive the one-arm BFD echo packet returned by the network device, and therefore incorrectly considers that the network device is faulty. As a result, a service of the network device may be incorrectly switched.

Based on the foregoing problem, this application provides a packet processing method, so that in a VXLAN multi-active gateway (for example, active-active gateway) scenario, it may be ensured that all one-arm BFD echo sessions always take effect when the VM is intact, to improve efficiency of detecting whether the VM is normal in the VXLAN multi-active gateway scenario by using the one-arm BFD echo session. The packet processing method provided in this application is described in detail below with reference to FIG. 5 by using the centralized VXLAN active-active gateway scenario shown in FIG. 4 as an example.

Figure 5:
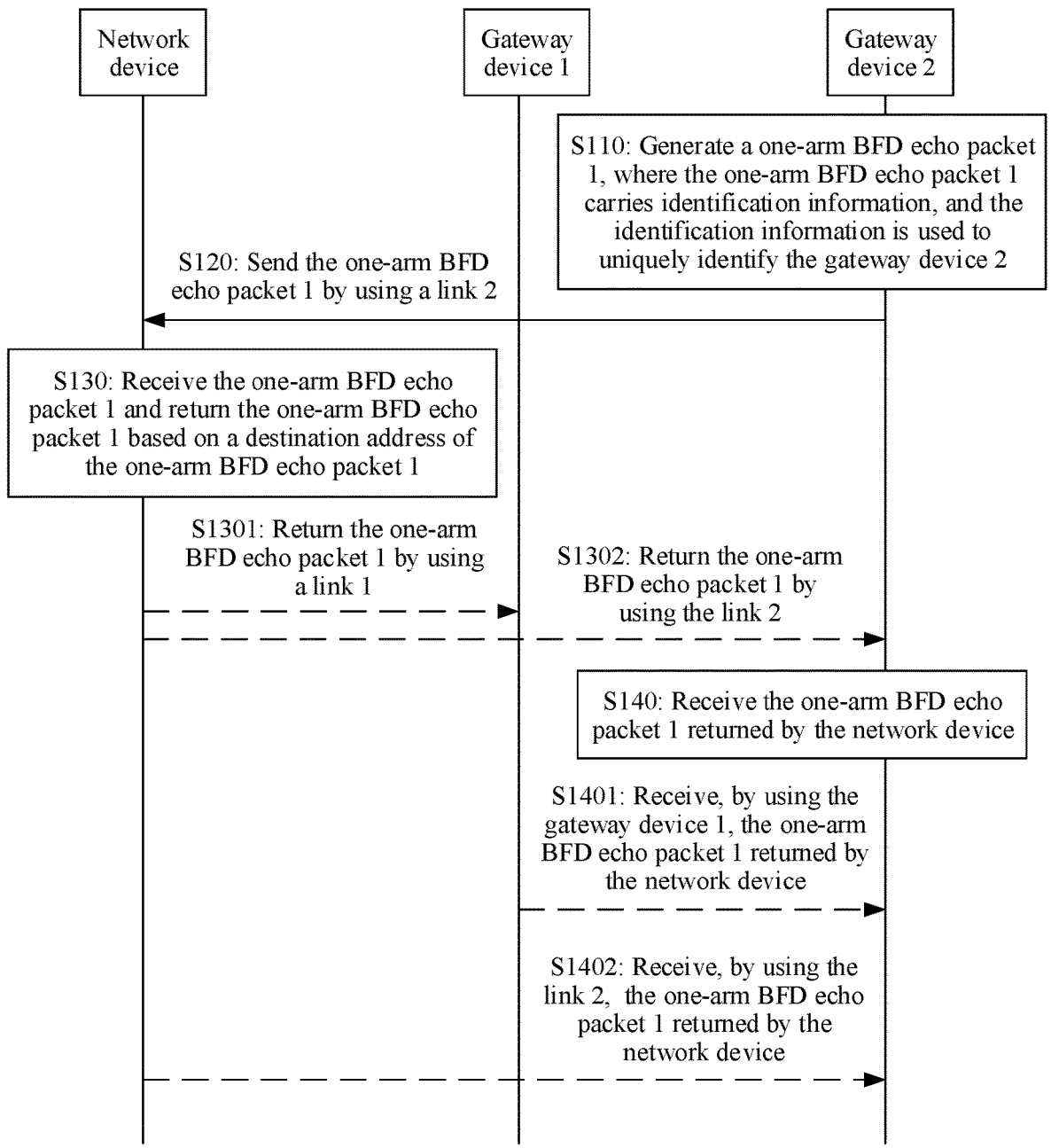
FIG. 5 is a schematic interaction diagram of a packet processing method according to an embodiment of this application.

FIG. 5 is a schematic interaction diagram of a packet processing method 100 according to an embodiment of this application. A network architecture to which the method 100 is applied includes a gateway device 1, a gateway device 2, and a network device. The gateway device 1 and the gateway device 2 may be spine nodes respectively, and an L3 gateway may be configured on each of the gateway device 1 and the gateway device 2. The gateway device 1 and the gateway device 2 may also be leaf nodes respectively. The L3 gateway and an L2 gateway may be configured on the gateway device 1, and the L3 and L2 gateways may be configured on the gateway device 2. The network device is multi-homed connected to the gateway device 1 and the gateway device 2, the network device is connected to the gateway device 1 by using a link 1, the network device is connected to the gateway device 2 by using a link 2, and the gateway device 1 and the gateway device 2 form a multi-active gateway. For example, the gateway device 1 may be the gateway device 1 shown in FIG. 4, the gateway device 2 may be the gateway device 2 shown in FIG. 4, the network device may be the network device shown in FIG. 4, and the link 1 and the link 2 are, for example, the link 1 and the link 2 shown in FIG. 4 respectively. The network architecture may be, for example, the network architecture shown in FIG. 4. The method 100 includes the following operations.

S110: The gateway device 2 generates a one-arm BFD echo packet 1. The one-arm BFD echo packet 1 carries identification information, and the identification information is used to uniquely identify the gateway device 2.

In a specific implementation, the identification information is a destination address of the one-arm BFD echo packet 1. The destination address of the one-arm BFD echo packet 1 is different from a source address of the one-arm BFD echo packet 1. For example, a source IP address of the one-arm BFD echo packet 1 is an IP address of a VBDIF of the gateway device 2, and the destination address of the one-arm BFD echo packet 1 is a loopback (loopback) address of the gateway device 2.

In another specific implementation, the identification information is a first MD and/or a first YD carried in the one-arm BFD echo packet 1. In the one-arm BFD echo packet 1, values of the first MD and the first YD are the same.

S120: The gateway device 2 sends the one-arm BFD echo packet 1 to the network device by using the link 2.

S130: The network device receives the one-arm BFD echo packet 1, and returns the one-arm BFD echo packet 1 based on the destination address of the one-arm BFD echo packet 1.

In a specific implementation, S130 includes:

S1301: The network device returns the one-arm BFD echo packet 1 by using the link 1.

In another specific implementation, S130 includes:

S1302: The network device returns, by using the link 2, the one-arm BFD echo packet 1.

S140: The gateway device 2 receives the one-arm BFD echo packet 1 returned by the network device.

After receiving the one-arm BFD echo packet 1 returned by the network device, the gateway device 2 checks the identification information carried in the one-arm BFD echo packet 1, determines that the one-arm BFD echo packet 1 is a one-arm BFD echo packet generated by the gateway device 2, and determines that the network device is not faulty.

In a specific implementation, S140 includes:

S1401: The gateway device 2 receives, by using the gateway device 1, the one-arm BFD echo packet 1 returned by the network device. S1401 is performed after S1301.

Specifically, after S1301 is performed, the network device returns the one-arm BFD echo packet 1 by using the link 1. A specific operation of receiving and returning the one-arm BFD echo packet 1 by the network device belongs to a related implementation in the prior art, and details are not described herein.

The gateway device 1 receives, by using the link 1, the one-arm BFD echo packet 1 returned by the network device. The gateway device 1 determines, based on the identification information carried in the one-arm BFD echo packet 1, to forward the one-arm BFD echo packet 1 to the gateway device 2.

When the identification information is the destination address of the one-arm BFD echo packet 1, the gateway device 1 performs route searching based on the destination address, to determine routing information. The gateway device 1 forwards the one-arm BFD echo packet 1 to the gateway device 2 based on the routing information.

When the identification information is the first MD and/or the first YD carried in the one-arm BFD echo packet 1, the gateway device 1 determines, based on the first MD and/or the first YD, that the first MD and/or the first YD are/is different from an MD stored in the gateway device 1, and determines that the received one-arm BFD echo packet 1 is not the one-arm BFD echo packet sent by the gateway device 1. The gateway device 1 forwards the one-arm BFD echo packet 1 to the gateway device 2 based on the first MD and/or the first YD carried in the one-arm BFD echo packet 1. The following specifically describes a process in which a gateway device processes a packet based on an MD and/or a YD carried in a BFD echo packet.

In a specific implementation, for example, the gateway device 2 may store a table which is referred to as a match table in the following for ease of description. The matching table stores values of the MD and the YD, and an action (action) performed after the MD and/or the YD are/is matched. For example, the gateway device 2 establishes a one-arm BFD echo session with the network device by sending a BFD echo packet 2 to the network device. When the one-arm BFD echo session between the gateway device 2 and the network device is configured, the value of the MD is set to 20. An MD value that is used by the gateway device 2 to perform the one-arm BFD echo session with the network device and that is stored by the gateway device 2 is 20.

The following uses an example to describe configuration commands when a one-arm BFD echo session is established between the gateway device 1 and the gateway device 2.

A configuration command for configuring a one-arm BFD echo session 1 on gateway device 1 is as follows:

Bfd1 bind peer-ip 132.170.1.1 vpn-instance vpn1 interface Vbdif10 one-arm-echo discriminator local 10.

Correspondingly, before the gateway device 2 sends the BFD echo packet 2, a configuration command for configuring a one-arm BFD echo session 2 on the gateway device 2 is as follows:

bfd 2 bind peer-ip 132.170.1.1 vpn-instance vpn1 interface Vbdif10 one-arm-echo discriminator local 20.

The peer-ip refers to an IP address of the network device. The discriminator local field indicates a my discriminator, namely, the MD described in this application. The my discriminator (MD) is used to distinguish different one-arm BFD echo packets. In other words, the MD is used to distinguish different one-arm BFD echo sessions.

After receiving the one-arm BFD echo packet 1, the gateway device 2 determines that the source IP address of the one-arm BFD echo packet 1 is the same as a destination IP address of the one-arm BFD echo packet 1, and is the IP address of the VBDIF interface of the gateway device 2. Further, the gateway device 2 obtains the MD and/or the YD carried in the one-arm BFD echo packet 1, and matches the MD and/or the YD with the MD of the gateway device 2. Because the values/value of the MD and/or the YD carried in the packet are/is different from the value of the MD that is of the BFD echo session and that is stored in the gateway device 2, a matching fails. The gateway device 2 searches the match table based on the values/value of the MD and/or the YD carried in the BFD echo packet 1. After finding a corresponding match entry, the gateway device 2 processes the packet based on an action specified in an action field, and forwards the packet to the gateway device 1. In this application, the action specified in the action field may be, for example, associated with a corresponding VXLAN tunnel or associated with a corresponding outbound interface. The following uses the gateway device 2 as an example to describe several manners in which the gateway device 2 obtains a my discriminator of the one-arm BFD echo session established by the gateway device 1.

Manner 1: The gateway device 2 obtains, by receiving a message sent by a control management device, the MD of the one-arm BFD echo session established by the gateway device 1. For example, a message sent through a management channel or a message sent by using a control channel protocol may be used to obtain the MD of the one-arm BFD echo session established by the gateway device 1. Currently, a commonly used management channel protocol may be, for example, a simple network management protocol SNMP), or a network configuration protocol (NETCONF). Currently, a commonly used control channel protocol may be, for example, an OpenFlow protocol, a path computation element communication protocol (PCEP), a border gateway protocol (BGP), or an interface to the routing system I2RS) protocol.

Manner 2: The gateway device 2 obtains, based on command line configuration, the my discriminator of the one-arm BFD echo session established by the gateway device 1. For example, an administrator logs in to the gateway device 2 to perform a configuration operation by using a command line.

A plurality of methods for obtaining an MD of a one-arm BFD echo session of another gateway device are provided, to enrich content of technical implementation and improves usability.

A person skilled in the art may understand that the "the my discriminator of the one-arm BFD echo session established by the gateway device 1" actually refers to a my discriminator configured to identify a one-arm BFD echo session when the one-arm BFD echo session is established between the gateway device 1 establishes and the network device. For example, the my discriminator is the discriminator local 10 in the BFD echo session 1 exemplified above.

In another specific implementation, S140 includes:

S1402: The gateway device 2 receives, by using the link 2, the one-arm BFD echo packet 1 returned by the network device. S1402 may be performed after S1302.

According to the packet processing method provided in this application, after the gateway device 2 sends the one-arm BFD echo packet 1, if the network device hashes the returned packet to the gateway device 1, the gateway device 1 sends, based on the identification information carried in the received one-arm BFD echo packet 1, the one-arm BFD echo packet 1 to the gateway device 2 uniquely identified by the identification information. Therefore, regardless of whether the network device returns the one-arm BFD echo packet 1 by using the link 2, as long as the network device is not faulty, the gateway device 2 may normally receive the one-arm BFD echo packet 1 returned by the network device, to implement a one-arm BFD echo session function of the gateway device 2. When the network device is not faulty, it may be effectively ensured that a one-arm BFD echo session of the gateway device 1 always takes effect, to improve efficiency of detecting, by using the one-arm BFD echo session, whether the network device is normal in a VXLAN multi-active gateway scenario, improve service fast detection and switchover capabilities of the gateway device 1 and the gateway device 2, and improve system working efficiency.

Figure 6:
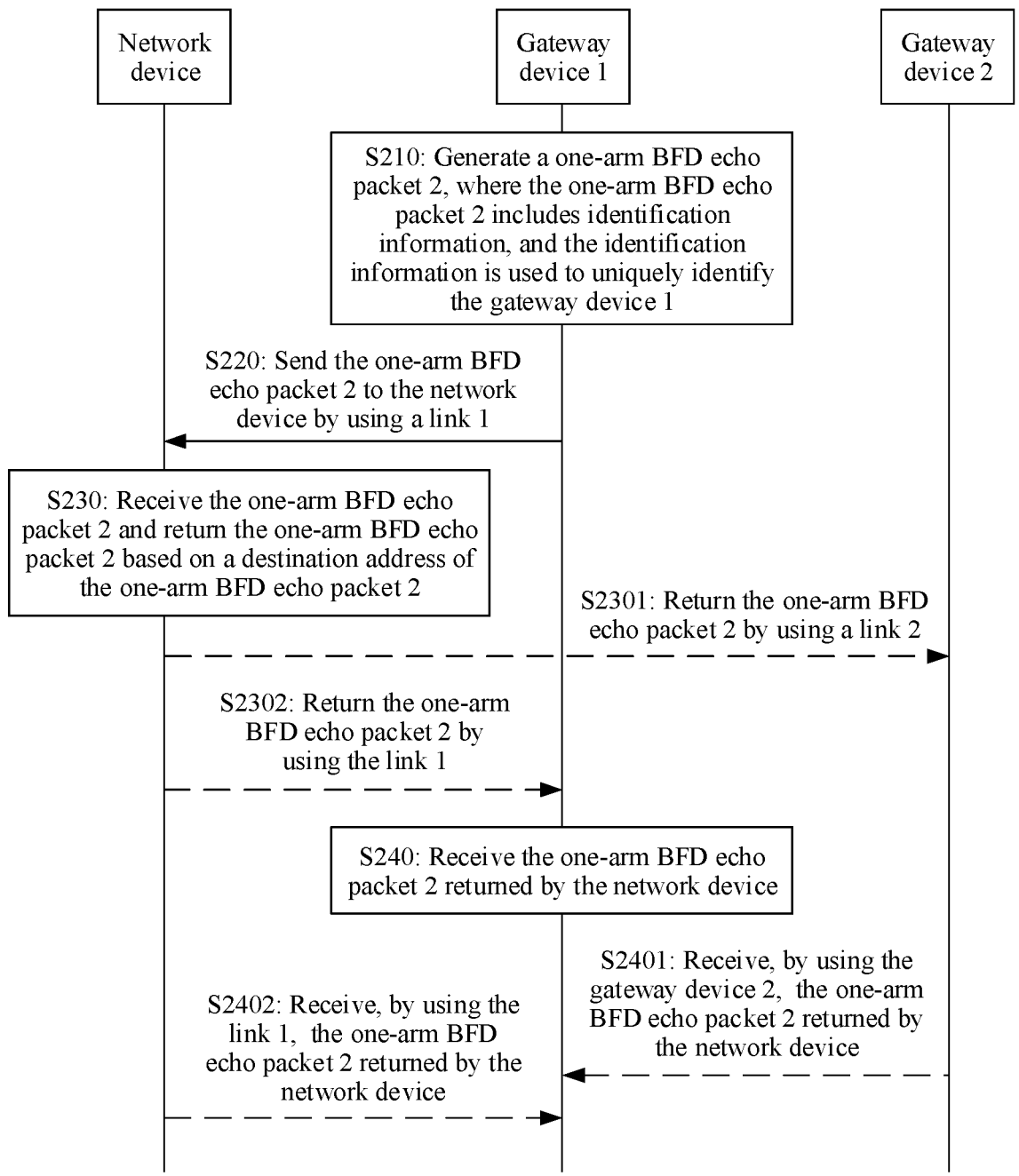
FIG. 6 is a schematic interaction diagram of a packet processing method according to another embodiment of this application.

This application further provides a method 200. The method 200 is performed by a gateway device 1. FIG. 6 is a schematic interaction diagram of a packet processing method 200 according to an embodiment of this application. A network architecture to which the method 200 is applied includes the gateway device 1, a gateway device 2, and a network device. The gateway device 1 and the gateway device 2 may be spine nodes respectively, and an L3 gateway may be configured on each of the gateway device 1 and the gateway device 2. The gateway device 1 and the gateway device 2 may also be leaf nodes respectively. The L3 gateway and an L2 gateway may be configured on the gateway device 1, and the L3 and L2 gateways may be configured on the gateway device 2. The network device is multi-homed connected to the gateway device 1 and the gateway device 2, the network device is connected to the gateway device 1 by using a link 1, the network device is connected to the gateway device 2 by using a link 2, and the gateway device 1 and the gateway device 2 form a multi-active gateway. For example, the gateway device 1 may be the gateway device 1 shown in FIG. 4, the gateway device 2 may be the gateway device 2 shown in FIG. 4, the network device may be the network device shown in FIG. 4, and the link 1 and the link 2 are, for example, the link 1 and the link 2 shown in FIG. 4 respectively. The network architecture may be, for example, the network architecture shown in FIG. 4. Execution sequences of the steps in the method 100 and the steps in the method 200 are not specifically limited. For example, S110 in the method 100 may be performed before S210 in the method 200, or may be performed after S210. S110 may be performed before S220, or may be performed after S220.

The method 200 includes the following operations.

S210: The gateway device 1 generates a one-arm BFD echo packet 2, where the one-arm BFD echo packet 2 includes identification information, and the identification information is used to uniquely identify the gateway device 1.

In a specific implementation, the identification information is a destination address of the one-arm BFD echo packet 2. The destination address of the one-arm BFD echo packet 2 is different from a source address of the one-arm BFD echo packet 2. For example, a source IP address of the one-arm BFD echo packet 2 is an IP address of a VBDIF of the gateway device 1, and the destination address of the one-arm BFD echo packet 2 is a loopback (loopback) address of the gateway device 1.

In another specific implementation, the identification information is a second MD and/or a second YD carried in the one-arm BFD echo packet 2.

A specific implementation process of S210 is similar to that of S110, and details are not described herein again.

S220: The gateway device 1 sends the one-arm BFD echo packet 2 to the network device by using the link 1.

S230: The network device receives the one-arm BFD echo packet 2 by using the link 1, and returns the one-arm BFD echo packet 2 based on the destination address of the one-arm BFD echo packet 2.

In a specific implementation, S130 includes:

S2301: The network device returns the one-arm BFD echo packet 2 by using the link 2.

In another specific implementation, S230 includes:

S2302: The network device returns the one-arm BFD echo packet 2 by using the link 1.

S240: The gateway device 1 receives the one-arm BFD echo packet 2 returned by the network device.

After receiving the one-arm BFD echo packet 2 returned by the network device, the gateway device 1 checks the identification information carried in the one-arm BFD echo packet 2, determines that the one-arm BFD echo packet 2 is a one-arm BFD echo packet generated by the gateway device 1, and determines that the network device is not faulty.

In a specific implementation, S240 includes:

S2401: The gateway device 1 receives, by using the gateway device 2, the one-arm BFD echo packet 2 returned by the network device. S2401 is performed after S2301.

In another specific implementation, S240 includes:

S2402: The gateway device 1 receives, by using the link 1, the one-arm BFD echo packet 2 returned by the network device. S2402 may be performed after S2302.

A specific process in which the gateway device 1 processes the one-arm BFD echo packet 2 based on the identification information carried in the one-arm BFD echo packet 2 is similar to a specific process, in the method 100, in which the gateway device 2 processes the one-arm BFD echo packet 1 based on the identification information carried in the one-arm BFD echo packet 1. For details, refer to descriptions of related parts of S140, S1401, and S1402 in the method 100. Details are not described herein again.

According to the packet processing method provided in this application, after the gateway device 1 sends the one-arm BFD echo packet 2, if the network device hashes the returned packet to the gateway device 2, the gateway device 2 sends, based on the identification information carried in the received one-arm BFD echo packet 2, the one-arm BFD echo packet 2 to the gateway device 1 uniquely identified by the identification information. Therefore, regardless of whether the network device returns the one-arm BFD echo packet 2 by using the link 1, as long as the network device is not faulty, the gateway device 1 may normally receive the one-arm BFD echo packet 2 returned by the network device, to implement a one-arm BFD echo session function of the gateway device 1. When the network device is not faulty, it may be effectively ensured that a one-arm BFD echo session of the gateway device 1 always takes effect, to improve efficiency of detecting, by using the one-arm BFD echo session, whether the network device is normal in a VXLAN multi-active gateway scenario, improve service fast detection and switchover capabilities of the gateway device 1 and the gateway device 2, and improve system working efficiency.

Figure 7:
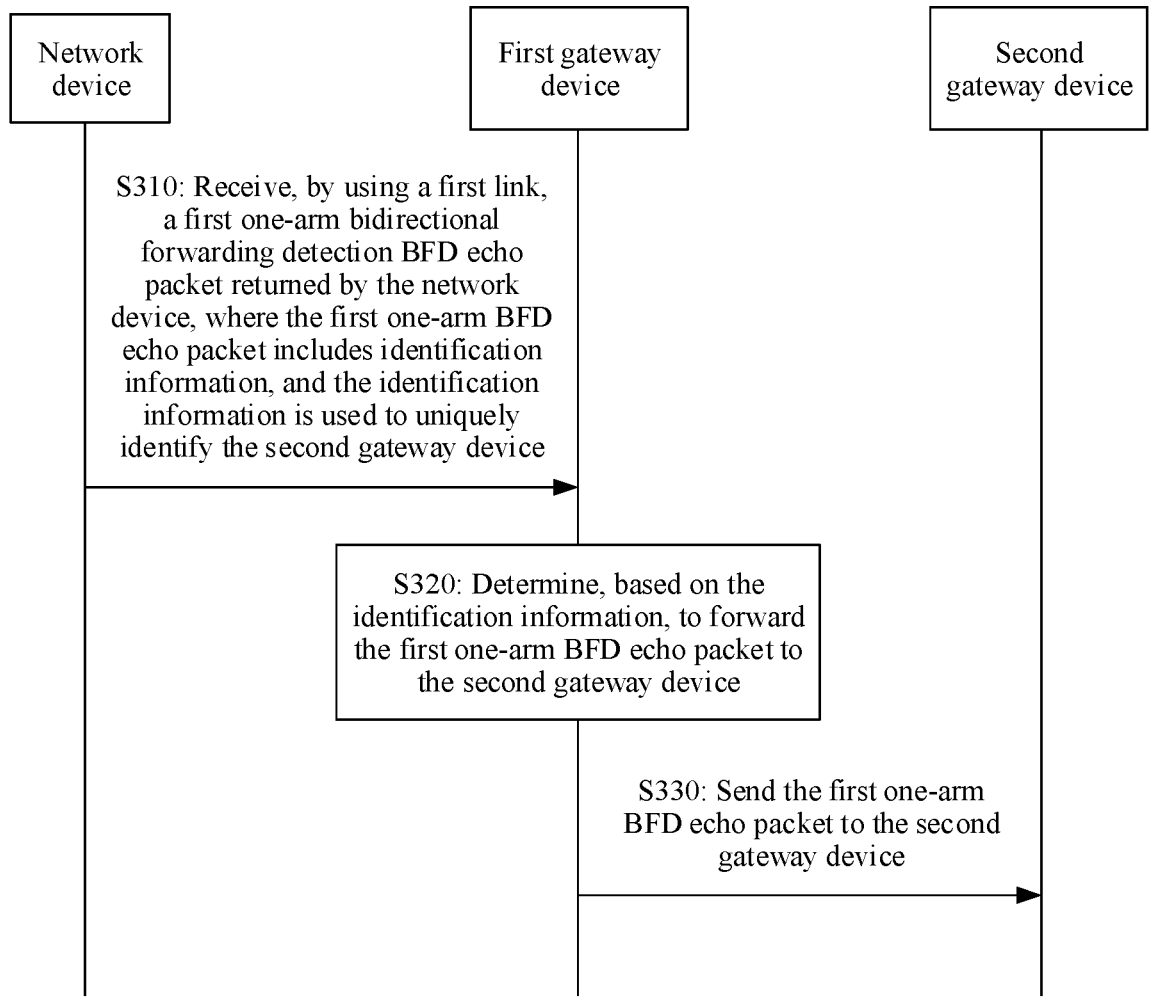
FIG. 7 is a schematic interaction diagram of a packet processing method according to still another embodiment of this application.

FIG. 7 is a schematic flowchart of a packet processing method 300 according to an embodiment of this application.

A network architecture to which the method 300 is applied includes at least a first gateway device, a second gateway device, and a network device. The first gateway device and the second gateway device may be spine nodes respectively. An L3 gateway may be configured on each of the first gateway device and the second gateway device. The first gateway device and the second gateway device may also be leaf nodes respectively, the L3 gateway and an L2 gateway may be configured on the first gateway device, and the L3 gateway and the L2 gateway may be configured on the second gateway device. The network device is multi-homed connected to the first gateway device and the second gateway device, the network device is connected to the first gateway device by using a first link, the network device is connected to the second gateway device by using a second link, and the first gateway device and the second gateway device form a multi-active gateway. For example, the first gateway device may be the gateway device 1 shown in FIG. 4, the second gateway device may be the gateway device 2 shown in FIG. 4, the network device may be the network device shown in FIG. 4, and the first link and the second link are, for example, the link 1 and the link 2 shown in FIG. 4 respectively. The network architecture may be, for example, the network architecture shown in FIG. 4. In addition, the method shown in FIG. 7 may specifically implement the method shown in FIG. 5 or FIG. 6. For example, the first gateway device, the second gateway device, and the network device in FIG. 7 may be the gateway device 1, the gateway device 2, and the network device in the method 100 shown in FIG. 5 or in the method 200 shown in FIG. 6 respectively. The method shown in FIG. 7 includes the following operations.

S310: The first gateway device receives, by using the first link, a first one-arm bidirectional forwarding detection BFD echo packet returned by the network device. The first one-arm BFD echo packet includes identification information, and the identification information is used to uniquely identify the second gateway device.

S320: The first gateway device determines, based on the identification information, to forward the first one-arm BFD echo packet to the second gateway device.

S330: The first gateway device sends the first one-arm BFD echo packet to the second gateway device.

In a specific implementation, the identification information is a destination address of the first one-arm BFD echo packet, and the destination address of the first one-arm BFD echo packet is different from a source address of the first one-arm BFD echo packet.

In a specific implementation, the method further includes: The first gateway device generates a second one-arm BFD echo packet. A destination address of the second one-arm BFD echo packet is used to uniquely identify the first gateway device. The destination address of the second one-arm BFD echo packet is different from the destination address of the first one-arm BFD echo packet. The first gateway device sends the second one-arm BFD echo packet to the network device by using the first link.

In a specific implementation, that the first gateway device determines, based on the identification information, to forward the first one-arm BFD echo packet to the second gateway device includes: The first gateway device determines routing information based on the destination address of the first one-arm BFD echo packet. The first gateway device determines, based on the routing information, to forward the first one-arm BFD echo packet to the second gateway device.

In a specific implementation, the destination address of the first one-arm BFD echo packet is a loopback interface address of the second gateway device, the destination address of the second one-arm BFD echo packet is a loopback interface address of the first gateway device, and the loopback interface address of the first gateway device is different from the loopback interface address of the second gateway device.

In a specific implementation, the identification information is a first my discriminator MD and/or a first your discriminator YD carried in the first one-arm BFD echo packet.

In a specific implementation, the method further includes: The first gateway device generates a third one-arm BFD echo packet. A second YD carried in the third one-arm BFD echo packet is used to uniquely identify the first gateway device, and the second YD is different from the first YD. The first gateway device sends the third BFD echo packet to the network device by using the first link.

When the method shown in FIG. 7 is used to implement the method shown in FIG. 5 or FIG. 6, the first one-arm BFD echo packet may be, for example, the one-arm BFD echo packet 1 in the method 100, and the second one-arm BFD echo packet and the third one-arm BFD echo packet may be, for example, the one-arm BFD echo packet 2 in the method 200. The first link may be, for example, the link 1 in the method 100, and the second link may be, for example, the link 2 in the method 100.

For a specific implementation of each step in the method 300, refer to related descriptions in the method 100 or the method 200. Details are not described herein again.

It should be further understood that the foregoing descriptions are merely intended to help a person skilled in the art better understand the embodiments of this application, but are not intended to limit the scope of the embodiments of this application. It is clear that the person skilled in the art may make various equivalent modifications or changes based on the foregoing examples. For example, some steps in the embodiments of the method described above may be unnecessary, some steps may be newly added, or any two or more of the foregoing embodiments may be combined. Such a modified, changed, or combined solution also falls within the scope of the embodiments of this application.

It should be further understood that, the foregoing descriptions of the embodiments of this application focus on a difference between the embodiments. For same or similar parts that are not mentioned, refer to each other. For brevity, details are not described herein again.

It should be further understood that a value of a sequence number of each of the foregoing process does not mean an order of an execution sequence. The execution sequence of each process should be determined based on a function and internal logic of each process, and should not be construed as any limitation on the implementation processes of the embodiments of this application.

It should be understood that division of manners, cases, types, and embodiments in the embodiments of this application are merely for ease of description, but should not constitute any special limitation, and features in various manners, types, cases, and embodiments may be combined when there is no contradiction.

It should be further understood that in the embodiments of this application, unless otherwise stated or there is a logic conflict, terms and/or descriptions between different embodiments are consistent and may be mutually referenced, and technical features in different embodiments may be combined according to an internal logical relationship thereof, to form a new embodiment.

Figure 8:
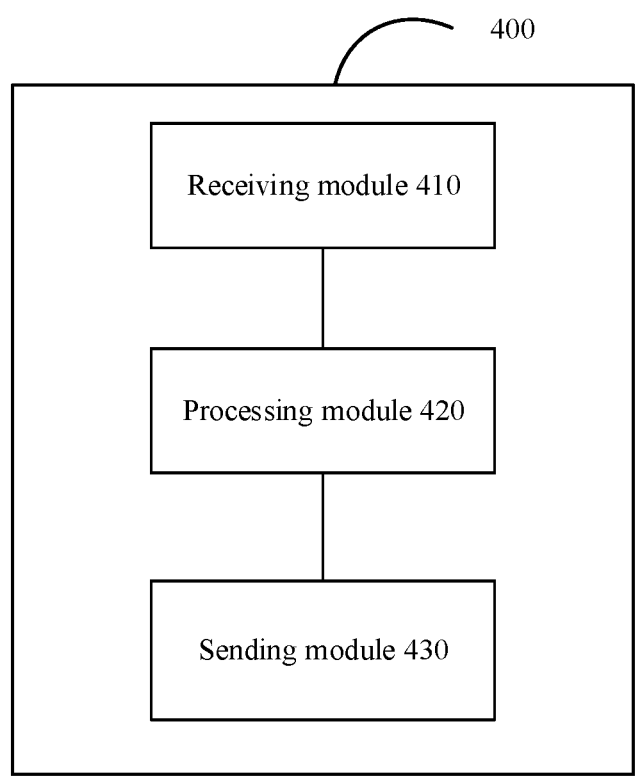
FIG. 8 is a schematic block diagram of a gateway device according to an embodiment of this application.

FIG. 8 is a schematic diagram of a gateway device 400 according to this application. The gateway device 400 may be used in the network architecture shown in FIG. 4, for example, may be the gateway device 1 in the network architecture shown in FIG. 4. The gateway device 400 is configured to perform an operation performed by the gateway device 1 in the method 100 or the method 200, or an operation performed by the first gateway device in the method 300. As shown in FIG. 8, the gateway device 400 may include a receiving module 410, and a processing module 420 and a sending module 430 that are connected to the receiving module 410.

The receiving module 410 is configured to receive, by using a first link, a first one-arm bidirectional forwarding detection BFD echo packet returned by a network device. The first one-arm BFD echo packet includes identification information, and the identification information is used to uniquely identify a second gateway device.

The processing module 420 is configured to determine, based on the identification information, to forward the first one-arm BFD echo packet to the second gateway device.

The sending module 430 is configured to send the first one-arm BFD echo packet to the second gateway device.

The network device is multi-homed connected to the first gateway device and the second gateway device, the network device is connected to the first gateway device by using the link 1, the network device is connected to the second gateway device by using a second link, and the first gateway device and the second gateway device form a multi-active gateway.

In a specific implementation, the identification information is a destination address of the first one-arm BFD echo packet, and the destination address of the first one-arm BFD echo packet is different from a source address of the first one-arm BFD echo packet.

In a specific implementation, the processing module 420 is further configured to generate a second one-arm BFD echo packet. A destination address of the second one-arm BFD echo packet is used to uniquely identify the first gateway device, and the destination address of the second one-arm BFD echo packet is different from the destination address of the first one-arm BFD echo packet. The sending module 430 is further configured to send the second one-arm BFD echo packet to the network device by using the first link.

In a specific implementation, the processing module 420 is further configured to determine routing information based on the destination address of the first one-arm BFD echo packet, and determine, based on the routing information, to forward the first one-arm BFD echo packet to the second gateway device.

In a specific implementation, the destination address of the first one-arm BFD echo packet is a loopback interface address of the second gateway device, the destination address of the second one-arm BFD echo packet is a loopback interface address of the first gateway device, and the loopback interface address of the first gateway device is different from the loopback interface address of the second gateway device.

In a specific implementation, the identification information is a first my discriminator MD and/or a first your discriminator YD carried in the first one-arm BFD echo packet.

In a specific implementation, the processing module 420 is further configured to generate a third one-arm BFD echo packet. A second YD carried in the third one-arm BFD echo packet is used to uniquely identify the first gateway device, and the second YD is different from the first YD. The sending module 430 is further configured to send the third BFD echo packet to the network device by using the first link.

Further, the gateway device 400 may further include a storage module 440. The storage module 440 is configured to store instructions executed by the receiving module 410, the processing module 420, and the sending module 430. The receiving module 410, the processing module 420, the sending module 430, and the storage module 440 are coupled to each other. The storage module 440 stores the instructions, the processing module 420 is configured to execute the instructions stored in the storage module 440, and the receiving module 410 and the sending module 430 are configured to receive and send a specific signal when driven by the processing module 420.

In an implementation process, each step of the foregoing method may be completed by using an integrated logical circuit of hardware in the processor 420 or an instruction in a form of software. The method disclosed with reference to embodiments of this application may be directly performed by a hardware processor, or may be performed by using a combination of hardware in the processor and a software module. The software module may be located in a mature storage medium in the art, such as a random access memory, a flash memory, a read-only memory, a programmable read-only memory, an electrically erasable programmable memory, or a register. The storage medium is located in the storage module 440. The processing module 420 reads information in the storage module 440, and performs, in combination with the hardware in the processing module 420, an operation performed by the gateway device 1 in the method 100 or the method 200 or an operation performed by the first gateway device in the method 300. To avoid repetition, details are not described herein again.

Figure 9:
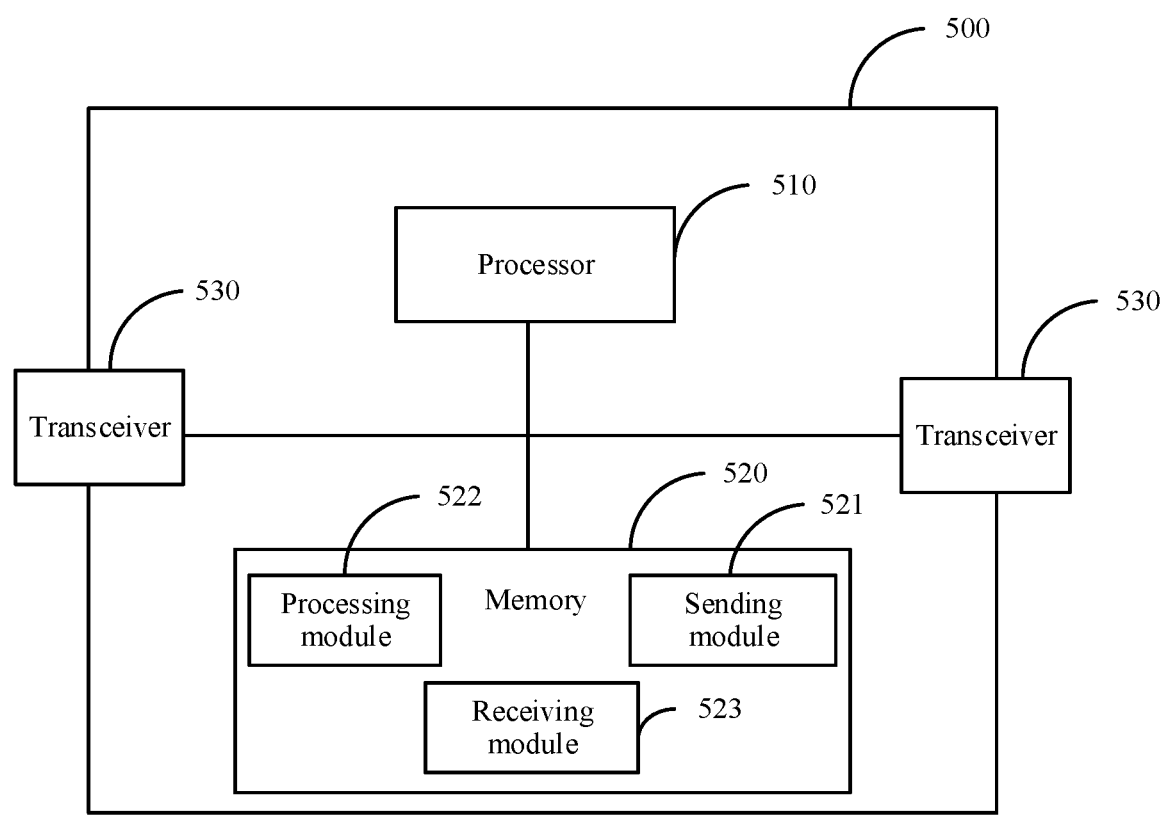
FIG. 9 is a schematic block diagram of a gateway device according to another embodiment of this application.

FIG. 9 is a schematic diagram of a gateway device 500 according to this application. The gateway device 500 may be used in the network architecture shown in FIG. 4, for example, may be the gateway device 1 in the network architecture shown in FIG. 4. The gateway device 500 is configured to perform an operation performed by the gateway device 1 in the method 100 or the method 200, or an operation performed by the first gateway device in the method 300. As shown in FIG. 9, the gateway device 500 may include a processor 510, a memory 520 coupled to the processor 510, and a transceiver 530. The processor 510 may be a central processing unit (CPU), a network processor (NP), or a combination of the CPU and the NP. The processor may further be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof. The processor 510 may further include a combination of the foregoing types of processors. The processor 510 may be one processor, or may include a plurality of processors. The memory 520 may be a volatile memory, for example, a random access memory (RAM). The memory may also include a non-volatile memory, for example, a read-only memory (ROM), a flash memory, a hard disk drive (HDD), or a solid-state drive (SSD). The memory 520 may further include a combination of the foregoing types of memories. The memory 520 may be one memory, or may include a plurality of memories. In an implementation, the memory 520 stores a computer-readable instruction, and the computer-readable instruction may include a plurality of software modules, for example, a sending module 521, a processing module 522, and a receiving module 523. After executing each software module, the processor 510 may perform a corresponding operation according to an indication of each software module. In this embodiment, an operation performed by a software module is actually an operation performed by the processor 510 according to an indication of the software module. For example, the receiving module 523 is configured to receive, by using a first link, a first one-arm bidirectional forwarding detection echo BFD echo packet that is returned by a network device and that carries identification information. The processing module 522 is configured to determine, based on the identification information, to forward the first one-arm BFD echo packet to a second gateway device. The sending module 521 is configured to send the first one-arm BFD echo packet to the second gateway device. In addition, after executing the computer-readable instruction in the memory 520, the processor 510 may perform, based on an indication of the computer-readable instruction, all operations that may be performed by the gateway device 1 or the first network device, for example, an operation performed by the gateway device 1 in the embodiment corresponding to FIG. 5 or FIG. 6, or an operation performed by the first gateway device in the embodiment corresponding to FIG. 7. After executing the computer-readable instruction in the memory 520, the processor 510 may perform, based on the indication of the computer-readable instruction, all operations that may be performed by the gateway device 2 or the second gateway device, for example, an operation performed by the gateway device 2 in the embodiment corresponding to FIG. 5 or FIG. 6, or an operation performed by the second gateway device in the embodiment corresponding to FIG. 7.

It should be noted that the values of the MD and the YD carried in the one-arm BFD echo packet described in any one of the foregoing embodiments of this application are the same.

The gateway device provided in this application may be a network device, for example, a router or a switch, or may be a line card or a chip that implements related functions in the foregoing method embodiments. This is not specifically limited in this application. The processor and the memory in the gateway device may be decoupled, be separately disposed on different physical devices, and be connected in a wired or wireless manner to implement respective functions of the processor and the memory, to support the system in implementing various functions in the foregoing embodiments. Alternatively, the processor and the memory may be coupled to a same device.

An embodiment of this application further provides a communications system, including the first gateway device and/or the second gateway device in the embodiment corresponding to FIG. 8 or FIG. 9, to perform the method 100 in the embodiment corresponding to FIG. 5, the method 200 in the embodiment corresponding to FIG. 6, or the method 300 in the embodiment corresponding to FIG. 7.

All or some of the embodiments may be implemented by using software, hardware, firmware, or any combination thereof. When software is used to implement the embodiments, the embodiments may be implemented all or partially in a form of a computer program product. The computer program product includes one or more computer instructions or computer programs. When the computer instructions or the computer programs are loaded and executed on a computer, the procedure or function according to the embodiments of this application is all or partially generated. The computer may be a general-purpose computer, a special-purpose computer, a computer network, or another programmable apparatus. The computer instruction may be stored in a computer-readable storage medium or may be transmitted from one computer-readable storage medium to another computer-readable storage medium. For example, the computer instruction may be transmitted from one website, computer, server, or data center to another website, computer, server, or data center in a wired (for example, infrared, radio, or microwave) manner. The computer-readable storage medium may be any usable medium accessible by the computer, or a data storage device, such as a server or a data center, integrating one or more usable medium sets. The usable medium may be a magnetic medium (for example, a floppy disk, a hard disk, or a magnetic tape), an optical medium (for example, a DVD), or a semiconductor medium. The semiconductor medium may be a solid-state drive.

The terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

Names may be assigned to various objects that may appear in this application, such as various messages/information/devices/network elements/systems/apparatuses/actions/operations/procedures/concepts. It may be understood that these specific names do not constitute a limitation on the related objects, and the assigned names may change with a factor such as a scenario, a context, or a use habit. Technical meanings of technical terms in this application should be understood and determined mainly based on functions and technical effects that are of the technical terms and that are reflected/performed in the technical solutions.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by the person skilled in the art that, for a purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. Indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve an objective of solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The storage medium includes any medium that can store program code, for example, a USB flash drive, a removable hard disk, a ROM, a RAM, a magnetic disk, or an optical disc.

All parts in this specification are described in a progressive manner. For same or similar parts in the embodiments, refer to these embodiments, and each embodiment focuses on a difference from another embodiment. Especially, apparatus and system embodiments are basically similar to a method embodiment, and therefore are described briefly; for related parts, refer to partial descriptions in the method embodiment.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A packet processing method, comprising:
   receiving, by a first gateway device using a first link, a first one-arm bidirectional forwarding detection BFD echo packet returned by a network device, wherein the first one-arm BFD echo packet comprises identification information, and the identification information uniquely identifying a second gateway device, wherein the first one-arm BFD echo packet was generated by the second gateway device and was sent to the network device by the second gateway device;
   wherein the first one-arm BFD echo packet was supposed to be returned back to the second gateway device by the network device which is not faulty;
   sending, by the first network device, the first one-arm BFD echo packet to the second gateway device, wherein
   the network device is multi-homed connected to the first gateway device and the second gateway device, the network device is connected to the first gateway device using the first link, the network device is connected to the second gateway device using a second link, and the first gateway device and the second gateway device form a multi-active gateway.

2. The method according to claim 1, wherein the identification information is a destination address of the first one-arm BFD echo packet, and the destination address of the first one-arm BFD echo packet is different from a source address of the first one-arm BFD echo packet.

3. The method according to claim 1, wherein the method further comprises:
   generating, by the first gateway device, a second one-arm BFD echo packet, wherein a destination address of the second one-arm BFD echo packet is used to uniquely identify the first gateway device, and the destination address of the second one-arm BFD echo packet is different from the destination address of the first one-arm BFD echo packet; and
   sending, by the first gateway device using the first link, the second one-arm BFD echo packet to the network device.

4. The method according to claim 1, wherein determining, by the first gateway device based on the identification information, to forward the first one-arm BFD echo packet to the second gateway device comprises:
   determining, by the first gateway device, routing information based on the destination address of the first one-arm BFD echo packet; and
   determining, by the first gateway device based on the routing information, to forward the first one-arm BFD echo packet to the second gateway device.

5. The method according to claim 3, wherein the destination address of the first one-arm BFD echo packet is a loopback interface address of the second gateway device, the destination address of the second one-arm BFD echo packet is a loopback interface address of the first gateway device, and the loopback interface address of the first gateway device is different from the loopback interface address of the second gateway device.

6. The method according to claim 1, wherein the identification information is at least one of a first my discriminator MD and a first your discriminator YD carried in the first one-arm BFD echo packet.

7. The method according to claim 6, wherein the method further comprises:
   generating, by the first gateway device, a third one-arm BFD echo packet, wherein a second YD carried in the third one-arm BFD echo packet is used to uniquely identify the first gateway device, and the second YD is different from the first YD; and
   sending, by the first gateway device using the first link, the third BFD echo packet to the network device.

8. A first gateway device, comprising:
   a non-transitory memory storing computer-readable instructions; and
   a processor connected to the memory, wherein the processor is configured to execute the computer-readable instructions in the memory, to enable the first gateway device to perform the following operations:
   receiving, using a first link, a first one-arm bidirectional forwarding detection BFD echo packet returned by a network device, wherein the first one-arm BFD echo packet comprises identification information, and the identification information is used to uniquely identify a second gateway device, wherein the first one-arm BFD echo packet was generated by the second gateway device and was sent to the network device by the second gateway device;

wherein the first one-arm BFD echo packet was supposed to be returned back to the second gateway device by the network device which is not faulty;

sending the first one-arm BFD echo packet to the second gateway device, wherein the network device is multi-homed connected to the first gateway device and the second gateway device, the network device is connected to the first gateway device using the first link, the network device is connected to the second gateway device using a second link, and the first gateway device and the second gateway device form a multi-active gateway.

9. The first gateway device according to claim 8, wherein the identification information is a destination address of the first one-arm BFD echo packet, and the destination address of the first one-arm BFD echo packet is different from a source address of the first one-arm BFD echo packet.

10. The first gateway device according to claim 8, wherein the first gateway device is further configured to perform the following operations:

generating a second one-arm BFD echo packet, wherein a destination address of the second one-arm BFD echo packet is used to uniquely identify the first gateway device, and the destination address of the second one-arm BFD echo packet is different from the destination address of the first one-arm BFD echo packet; and sending, using the first link, the second one-arm BFD echo packet to the network device.

11. The first gateway device according to claim 9, wherein the first gateway device is further configured to perform the following operations:

generating a second one-arm BFD echo packet, wherein a destination address of the second one-arm BFD echo packet is used to uniquely identify the first gateway device, and the destination address of the second one-arm BFD echo packet is different from the destination address of the first one-arm BFD echo packet; and sending, using the first link, the second one-arm BFD echo packet to the network device.

12. The first gateway device according to claim 8, wherein the first gateway device is further configured to perform the following operations:

determining routing information based on the destination address of the first one-arm BFD echo packet; and determining, based on the routing information, to forward the first one-arm BFD echo packet to the second gateway device.

13. The first gateway device according to claim 9, wherein the first gateway device is further configured to perform the following operations:

determining routing information based on the destination address of the first one-arm BFD echo packet; and determining, based on the routing information, to forward the first one-arm BFD echo packet to the second gateway device.

14. The first gateway device according to claim 10, wherein the destination address of the first one-arm BFD echo packet is a loopback interface address of the second gateway device, the destination address of the second one-arm BFD echo packet is a loopback interface address of the first gateway device, and the loopback interface address of the first gateway device is different from the loopback interface address of the second gateway device.

15. The first gateway device according to claim 8, wherein the identification information is at least one of a first my discriminator MD and a first your discriminator YD carried in the first one-arm BFD echo packet.

16. The first gateway device according to claim 15, wherein the first gateway device is further configured to perform the following operations:

generating a third one-arm BFD echo packet, wherein a second YD carried in the third one-arm BFD echo packet is used to uniquely identify the first gateway device, and the second YD is different from the first YD; and sending, by the first gateway device using the first link, the third BFD echo packet to the network device.

17. A communications system, wherein the communications system comprises the first gateway device, wherein the first gateway device is used to:

receiving, using a first link, a first one-arm bidirectional forwarding detection BFD echo packet returned by a network device, wherein the first one-arm BFD echo packet comprises identification information, and the identification information is used to uniquely identify a second gateway device, wherein the first one-arm BFD echo packet was generated by the second gateway device and was sent to the network device by the second gateway device;

wherein the first one-arm BFD echo packet was supposed to be returned back to the second gateway device by the network device which is not faulty;

sending the first one-arm BFD echo packet to the second gateway device, wherein the network device is multi-homed connected to the first gateway device and the second gateway device, the network device is connected to the first gateway device using the first link, the network device is connected to the second gateway device using a second link, and the first gateway device and the second gateway device form a multi-active gateway.

18. The communications system according to claim 17, wherein the identification information is a destination address of the first one-arm BFD echo packet, and the destination address of the first one-arm BFD echo packet is different from a source address of the first one-arm BFD echo packet.

19. The communications system according to claim 17, wherein the first gateway device is further configured to perform the following operations:

generating a second one-arm BFD echo packet, wherein a destination address of the second one-arm BFD echo packet is used to uniquely identify the first gateway device, and the destination address of the second one-arm BFD echo packet is different from the destination address of the first one-arm BFD echo packet; and sending, using the first link, the second one-arm BFD echo packet to the network device.

20. The communications system according to claim 17, wherein the first gateway device is further configured to perform the following operations:

determining routing information based on the destination address of the first one-arm BFD echo packet; and determining, based on the routing information, to forward the first one-arm BFD echo packet to the second gateway device.

* * * * *